(12) United States Patent
Zeller et al.

(10) Patent No.: US 12,012,884 B1
(45) Date of Patent: Jun. 18, 2024

(54) ENGINE WITH EXHAUST HEATER

(71) Applicant: Robert Bosch GmbH, Stuttgart (DE)

(72) Inventors: Mischa Zeller, Leonberg (DE);
Christian Disch, Wimsheim (DE);
Brent Keppy, Waterford, MI (US);
Ryan Neal O'Donnell, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/305,900

(22) Filed: Apr. 24, 2023

(51) Int. Cl.
*F01N 3/20* (2006.01)
*F01N 3/10* (2006.01)

(52) U.S. Cl.
CPC ........... *F01N 3/2033* (2013.01); *F01N 3/101* (2013.01); *F01N 2470/16* (2013.01); *F01N 2470/18* (2013.01)

(58) Field of Classification Search
CPC ............... F01N 13/107; F01N 2240/14; F01N 3/2033
See application file for complete search history.

(56) References Cited

U.S. PATENT DOCUMENTS

| | | | | |
|---|---|---|---|---|
| 4,373,330 A | * | 2/1983 | Stark | F01N 3/025 55/284 |
| 4,840,028 A | * | 6/1989 | Kusuda | F01N 3/0256 60/303 |
| 5,216,883 A | * | 6/1993 | Flugger | F01N 13/08 60/323 |
| 5,284,016 A | * | 2/1994 | Stark | F01N 9/00 60/303 |
| 5,396,764 A | * | 3/1995 | Rao | F01N 13/011 60/287 |
| 5,570,576 A | | 11/1996 | Ament et al. | |
| 5,647,207 A | * | 7/1997 | Grotjahn | F01N 13/011 60/300 |
| 5,657,625 A | | 8/1997 | Koga et al. | |

FOREIGN PATENT DOCUMENTS

| | | |
|---|---|---|
| DE | 102016206394 A1 | 10/2017 |
| EP | 0681644 B1 | 7/1997 |

* cited by examiner

*Primary Examiner* — Anthony Ayala Delgado
(74) *Attorney, Agent, or Firm* — Michael Best & Friedrich LLP

(57) ABSTRACT

An internal combustion engine including a first and a second manifold coupled to exhaust ports of a first and a second plurality of cylinders to receive exhaust gas therefrom. The engine includes a first and a second pipe configured to receive the exhaust gas from the manifolds. The engine includes a collector including a first and second inlet coupled to the pipes and an outlet configured to receive a merged flow of the exhaust gas from the first and second pipe. The engine includes a catalyst configured to receive a merged flow of the exhaust gas from the outlet and treats the exhaust gas and a heater assembly configured to selectively supply heat energy to the exhaust gas from the first pipe and the second pipe. The heater assembly includes a connecting portion coupled to the collector.

19 Claims, 5 Drawing Sheets

ENGINE WITH EXHAUST HEATER

BACKGROUND

The present disclosure relates to internal combustion engines. More particularly, the present disclosure relates to supplemental heaters for engine exhaust systems.

Conventionally, catalytic converters are used to reduce the emissions of the exhaust for internal combustion engines. Catalytic converters are only effective at reducing emissions as designed upon heating up to a certain temperature called the "light off" temperature. Particularly, at cold start, the catalytic converter needs to absorb heat from the combustion process in order to reach the light off temperature. In some cases, it is known to add a supplemental heater to reduce the time it takes to reach the light off temperature of the catalytic converter.

SUMMARY

The present disclosure provides, in one aspect, an internal combustion engine including a first manifold coupled to exhaust ports of a first plurality of cylinders to receive exhaust gas therefrom and a second manifold coupled to exhaust ports of a second plurality of cylinders to receive exhaust gas therefrom. The internal combustion engine further includes a first pipe configured to receive the exhaust gas from the first manifold and a second pipe configured to receive the exhaust gas from the second manifold. The internal combustion engine includes a collector including a first inlet coupled to the first pipe, a second inlet coupled to the second pipe, and an outlet. The outlet is configured to receive a merged flow of the exhaust gas from the first pipe and the second pipe. The internal combustion engine includes a catalyst configured to receive a merged flow of the exhaust gas from the outlet of the collector and is configured to treat the exhaust gas from the first and second pipe. The internal combustion engine includes a heater assembly configured to selectively supply heat energy to the exhaust gas from the first pipe and the second pipe and includes a connecting portion coupled to the collector.

The present disclosure provides, in one aspect, an internal combustion engine including a first bank and a second bank disposed on opposing sides of a crankshaft axis. The internal combustion engine includes a first pipe coupled to an exhaust port of a first cylinder on the first bank to receive exhaust gas therefrom and a second pipe coupled to exhaust port of a second cylinder on the second bank to receive exhaust gas therefrom. The internal combustion engine includes a collector including a first inlet coupled to the first pipe, a second inlet coupled to the second pipe, and an outlet. The outlet is configured to receive a merged flow of the exhaust gas from the first pipe and the second pipe. The internal combustion engine includes a catalyst configured to receive a merged flow of the exhaust gas from the outlet of the collector and configured to treat the exhaust gas from the first pipe and second pipe. The internal combustion engine includes a heater assembly configured to selectively supply heat energy to the exhaust gas from the first pipe and the second pipe. The heater assembly includes a fuel burning heater and a connecting portion coupled to the collector. The connecting portion is disposed between the first inlet and the second inlet.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
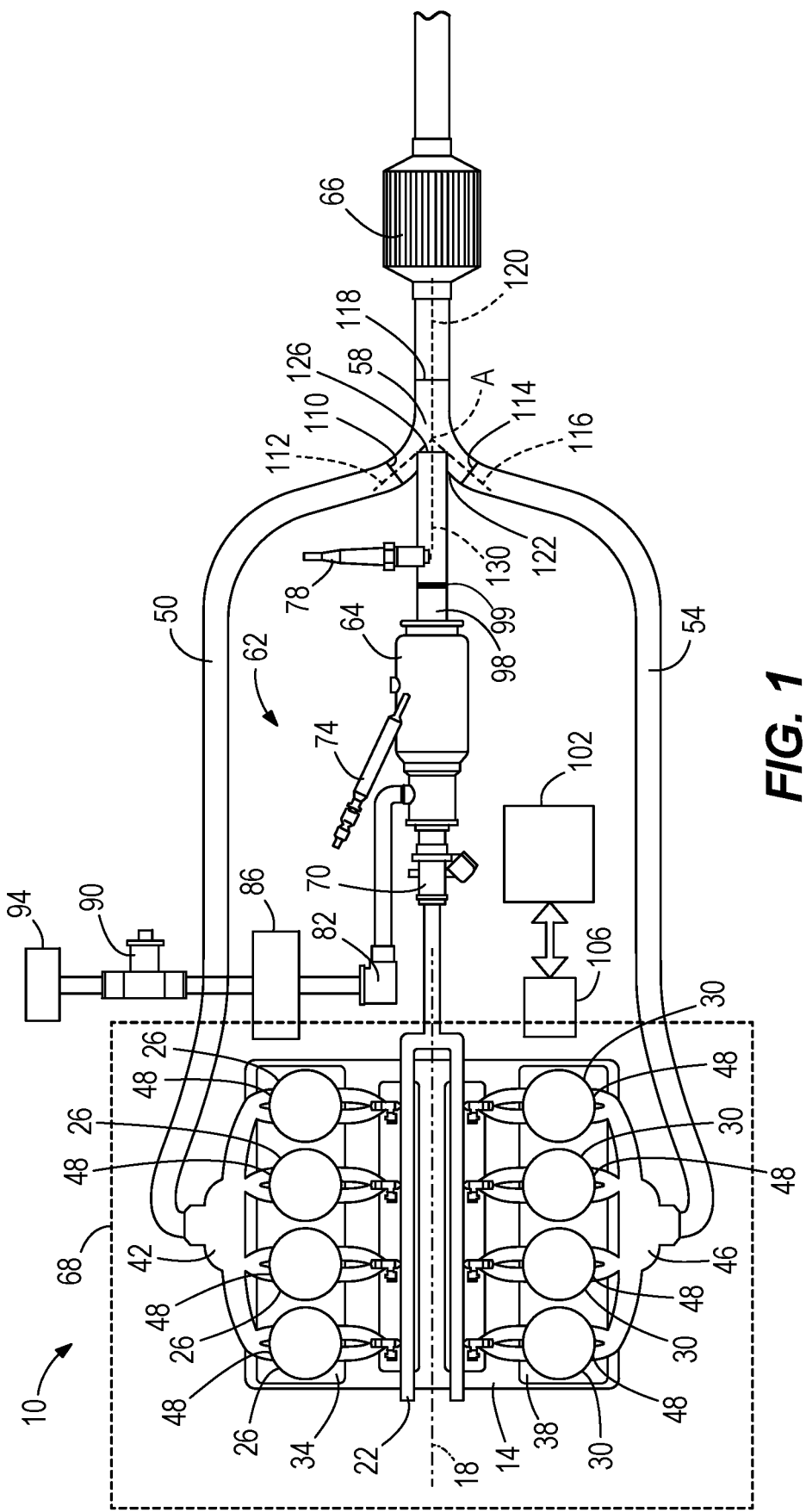
FIG. 1 schematically illustrates an internal combustion engine.

FIG. 1 illustrates an internal combustion engine 10 including an engine block 14, a crankshaft axis 18, a fuel delivery system 22, a first plurality of cylinders 26, and a second plurality of cylinders 30. The first plurality of cylinders 26 are on a first bank 34 and include a total of four cylinders. The second plurality of cylinders 30 are on a second bank 38 and include a total of four cylinders on the opposing side of a bisector plane that extends into the page in FIG. 1 and through the crankshaft axis 18. The fuel delivery system 22, for example including one or more fuel rails, is configured to deliver fuel to the first plurality of cylinders 26 and the second plurality of cylinders 30. A portion of the fuel delivery system 22 may be disposed on the engine block 14. An exhaust system of the internal combustion engine 10 includes a first manifold 42 coupled to exhaust ports 48 from the first plurality of cylinders 26. The first plurality of cylinders 26 include an exhaust port 48 at each of the four cylinders. The first manifold 42 includes four inlets at an upstream end thereof coupled to the four corresponding exhaust ports 48 of the first plurality of cylinders 26. The first manifold 42 is configured to combine exhaust gases from the inlets and direct the combined exhaust gases to an outlet at a downstream end of the first manifold 42. A first pipe 50 is configured to receive the exhaust gas from the outlet of the first manifold 42 and is coupled to the outlet of the first manifold 42. The internal combustion engine 10 includes a second manifold 46 coupled to the exhaust ports 48 of the second plurality of cylinders 30. The second plurality of cylinders 30 include an exhaust port 48 at each of the four cylinders. The second manifold 46 includes four inlets at an upstream end thereof coupled to the four corresponding exhaust ports 48 of the second plurality of cylinders 30. The second manifold 46 is configured to combine exhaust gases from the inlets and direct the combined exhaust gases to an outlet at a downstream end of the second manifold 46. A second pipe 54 is configured to receive the exhaust gas from the outlet of the second manifold 46 and is coupled to the outlet of the second manifold 46. A collector 58 is configured to receive a merged flow of the exhaust gas from the first pipe 50 and the second pipe 54.

The illustrated internal combustion engine 10 further includes a heater assembly 62 disposed between the first pipe 50 and the second pipe 54 to selectively supply heat energy to the exhaust gas from the first pipe 50 and the second pipe 54. The heater assembly 62 may selectively heat a fluid and supply the heated fluid to the exhaust gas. The heater assembly 62 includes a burner 64 (i.e., fuel burning heater). The heater assembly 62 includes a fuel injector 70, a glow plug 74, a lambda sensor 78, a check valve 82, a secondary air pump 86, an air flow meter 90, and a filter 94.

The fuel injector 70 is connected to the fuel delivery system 22 and supplies fuel to the burner 64. The heater assembly 62 includes the filter 94 and the air flow meter 90 to supply filtered and measurable air to the check valve 82. The air and fuel are mixed in the burner 64 and are heated and ignited by the glow plug 74. The combusted air and fuel mixture is configured to move from the burner 64 to the collector 58 through a connecting portion 98. The connecting portion 98 may include a mixer 99 with internal geometry used to mix the air and fuel to ensure an efficient combustion process. The connecting portion 98 is coupled to the collector 58. The lambda sensor 78 is used to determine the remaining oxygen content in the air to fuel ratio. The heater assembly 62 further includes a heater control unit 102 which communicates with the engine control unit 106. The heater control unit 102 is configured to control the fuel injector 70 and the check valve 82 in response to signals generated by the lambda sensor 78 from detection of oxygen levels. Additionally, the heater control unit 102 is capable of open and/or close loop control, which will be discussed further below.

With continued reference to FIG. 1, the collector 58 includes a first inlet 110, a second inlet 114 and an outlet 118. The first inlet 110 and the second inlet 114 couple the first pipe 50 and the second pipe 54 to the collector 58. The outlet 118 is configured to receive a merged flow of the exhaust gas from the first pipe 50 and the second pipe 54 and direct the merged flow to a catalyst 66. The catalyst 66 is aligned with the outlet 118. The first inlet 110 defines an inlet axis 112 and the second inlet 114 defines an inlet axis 116. The outlet 118 defines an outlet axis 120. The connecting portion 98 is received by a third inlet 122 of the collector 58. The first inlet 110 and the second inlet 114 are disposed symmetrically about the third inlet 122. The connecting portion 98 has an end 126 that extends into the center of the collector 58. In some constructions, the end 126 may include a nozzle. The end 126 of the connecting portion 98 defines a connecting portion axis 130 along which the flow of heated fluid from the heater assembly 62 is directed into the collector 58. The inlet axes 112, 116 of the collector exhaust inlets 110, 114, the collector outlet axis 120, and the connecting portion axis 130 intersect at a point A. The position of the intersection point A is selected to properly mix the exhaust gas from the first pipe 50 and the second pipe 54 before entering the catalyst 66 to ensure uniform heat-up of the downstream catalyst 66. The outlet axis 120 and the connecting portion axis 130 are aligned. The connecting portion axis 130 is arranged with an equal angular offset from the inlet axis 112 and the inlet axis 116. The inlet axis 112 and the inlet axis 116 are configured to be offset from the outlet axis 120.

The catalyst 66 is configured to receive the merged flow of the exhaust gas from the outlet 118 of the collector 58 and configured to treat the merged flow of exhaust gas via a predetermined chemical reaction to reduce or eliminate unwanted compounds (e.g., hydrocarbons, CO, NOx). In the illustrated embodiment, the catalyst 66 is a three-way catalytic converter for a gasoline engine. In other embodiments, the catalytic converter can be a diesel oxidation catalyst for a diesel engine. The heater assembly 62 is configured to supply heat into the catalyst 66 and may assist to raise the temperature thereof from below the "light off" temperature up to or above the light off temperature so that the catalyst 66 is effective to reduce emissions. The heater assembly 62 can heat the catalyst 66 by a flame or other mechanism to transfer heat into the exhaust gas upstream of the catalyst 66 so that the exhaust gas entering the catalyst 66 is hotter than it would be from the engine's combustion alone. The heater assembly 62 can be controlled with open loop control and/or closed loop control by the heater control unit 102 programmed with an algorithm. The heater control unit 102 receives input signals, the algorithm analyzes the input signals, and the algorithm computes an output. The output may include a signal to active or deactivate the fuel injector 70, the air pump 86, and/or the burner 64. In open loop control, the heater assembly 62 can be programmed to release a certain amount of energy and/or operate for a predetermined amount of time. The operation of the heater assembly 62 can be set in relation to input conditions such as ambient temperature and/or starting temperature of the catalyst 66 (or the engine's oil or coolant). In closed loop control, the temperature and/or efficiency of the catalyst 66 can be monitored (e.g., with a temperature sensor and/or one or more oxygen sensors, respectively) in order to maintain operation of the heater assembly 62 until the catalyst light off temperature has been reached. The heater assembly 62 can be run at a single heat output setting throughout its operation or modulated according to the algorithm.

Figure 2:
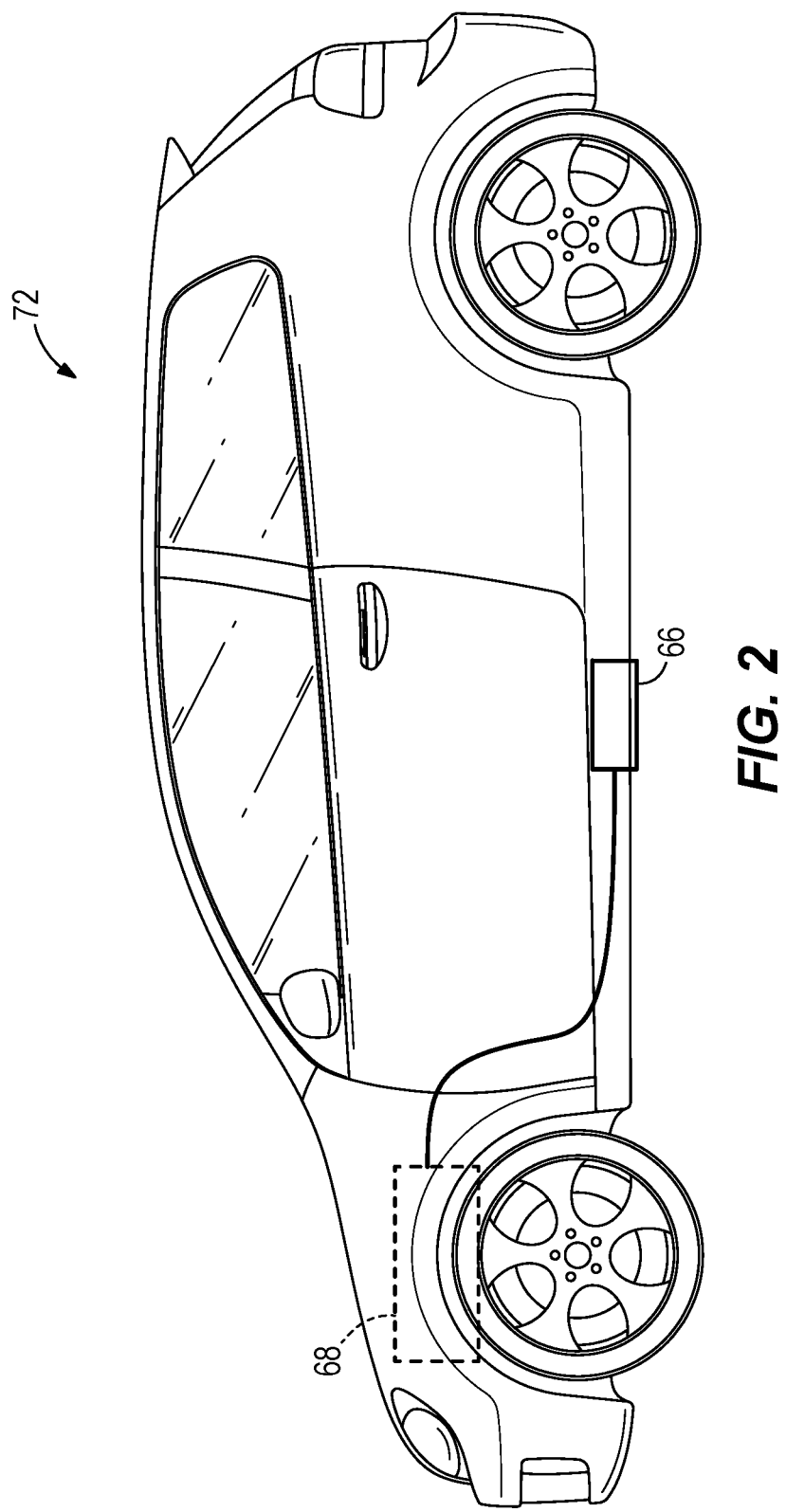
FIG. 2 schematically illustrates an engine bay of a car and a catalyst.

As illustrated in FIGS. 1 and 2, the engine's exhaust system can be provided without any catalysts located between the exhaust ports 48 and the collector 58. In some constructions, a vehicle 72 (FIG. 2) having the engine 10 of FIG. 1, complete with exhaust system fitted, can have an engine bay 68 that is devoid of any catalyst within the engine bay 68. The only catalyst(s) 66 are outside the engine bay 68—located in the underfloor area, which may be directly below a passenger compartment of the vehicle 72. Although far removed from the exhaust ports 48, where temperatures are hottest, the catalyst 66 relies on the supplied heat energy from the heater assembly 62 for proper operation, including quick light off from cold starts. This is in contrast to many conventional configurations in which one or more catalysts are placed further upstream, including at or directly downstream of the manifolds. Catalysts located in this area are commonly referred to as "close-coupled" catalysts. Catalysts that are located closer to the engine block can more effectively receive the heat from combustion in the engine and therefore reach the "light off" temperature faster than catalysts located in the underfloor—when relying solely on heat from combustion in the engine. However, the addition of close-coupled catalyst increases the cost of the exhaust system (e.g., often requiring customized solutions and/or a separate catalyst for each cylinder bank). Any close-coupled catalyst also takes up valuable space in the engine bay, which is a limited amount of space in which numerous components must be packaged. Additionally, the smaller, close-coupled catalysts may not be capable of treating all the exhaust gasses for extended operating times such that an additional underfloor catalyst may also be required. Therefore, providing the vehicle 72 with the catalyst(s) 66 located exclusively in the underfloor saves space and is less expensive. The catalyst 66 can be shared by both banks 34, 38 of cylinders. The catalyst 66 may be of a larger standardized construction, incompatible for close-coupling configurations.

Figure 3:
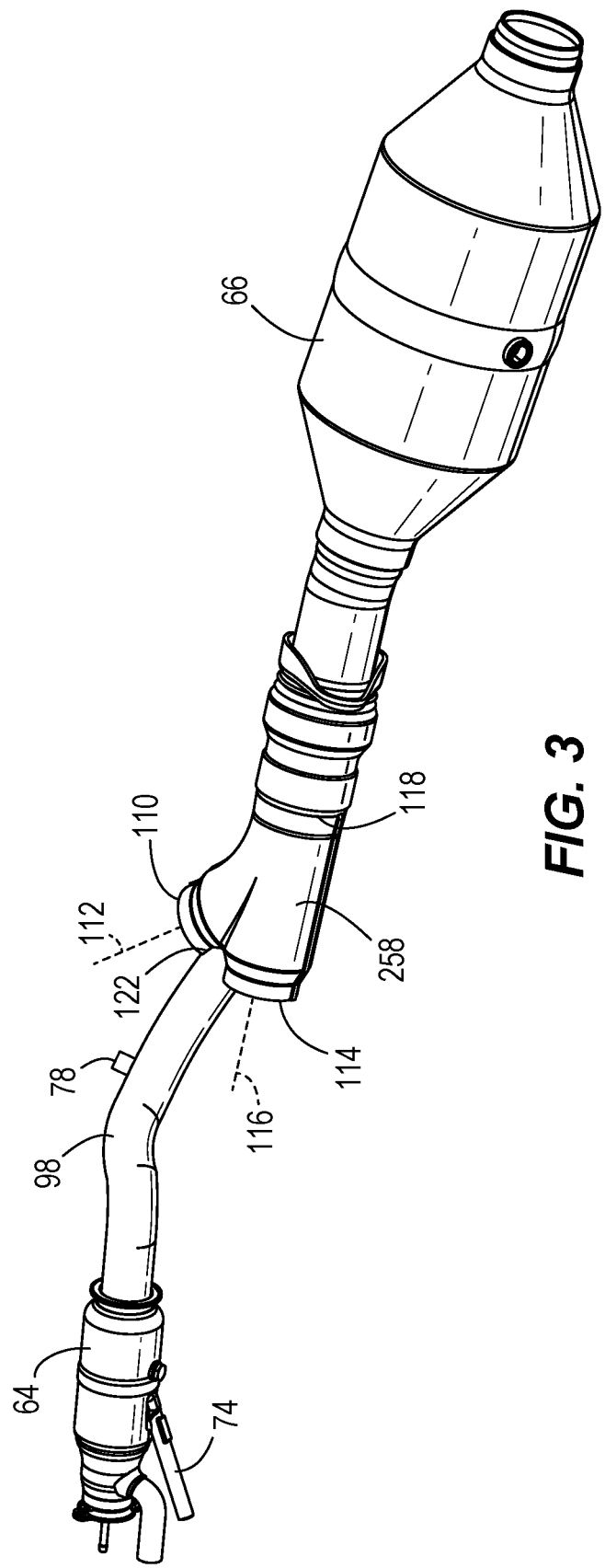
FIG. 3 is a top perspective view of a collector and a heater.
Figure 4:
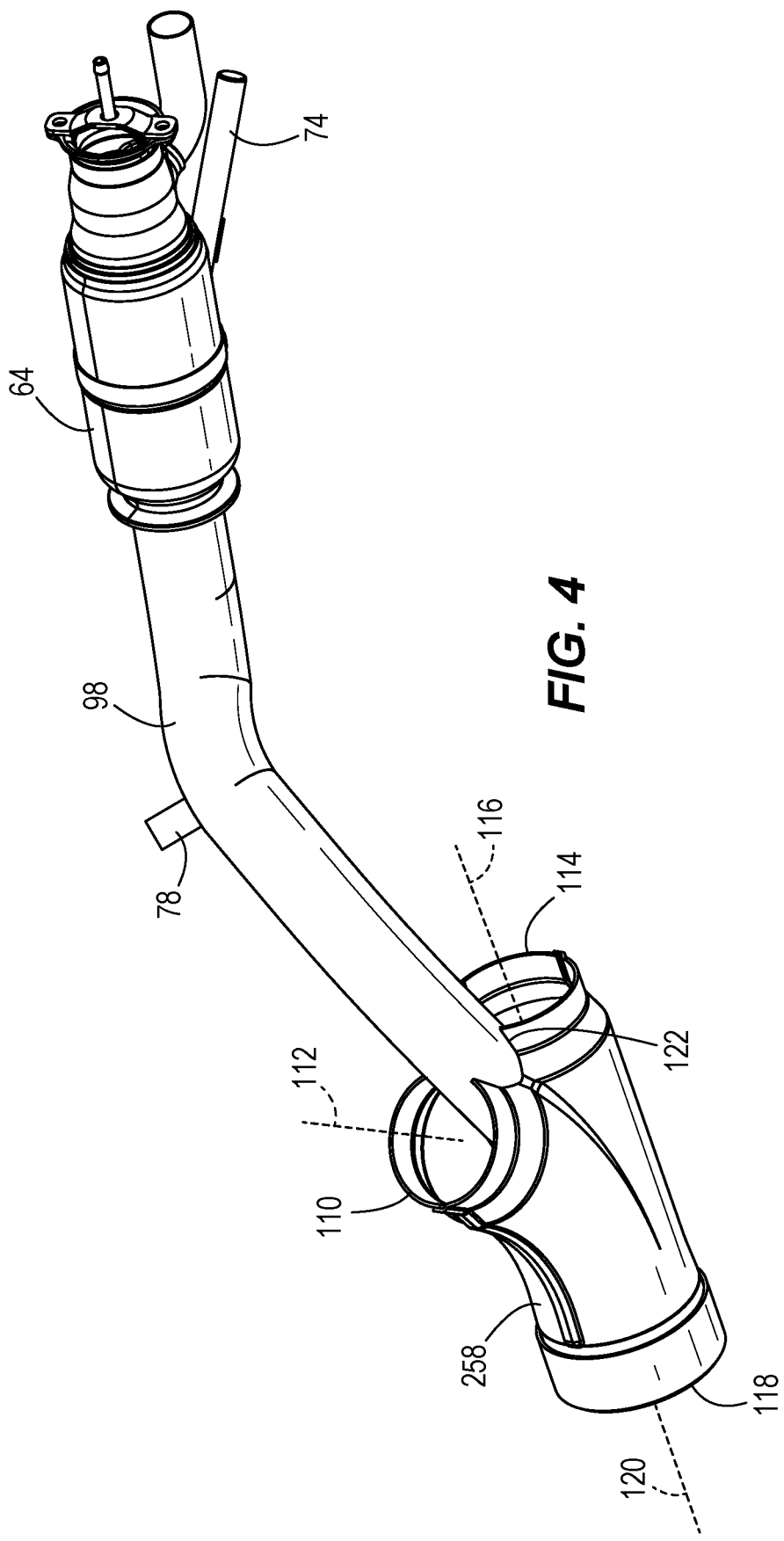
FIG. 4 is a bottom perspective view of the collector and the heater.
Figure 5:
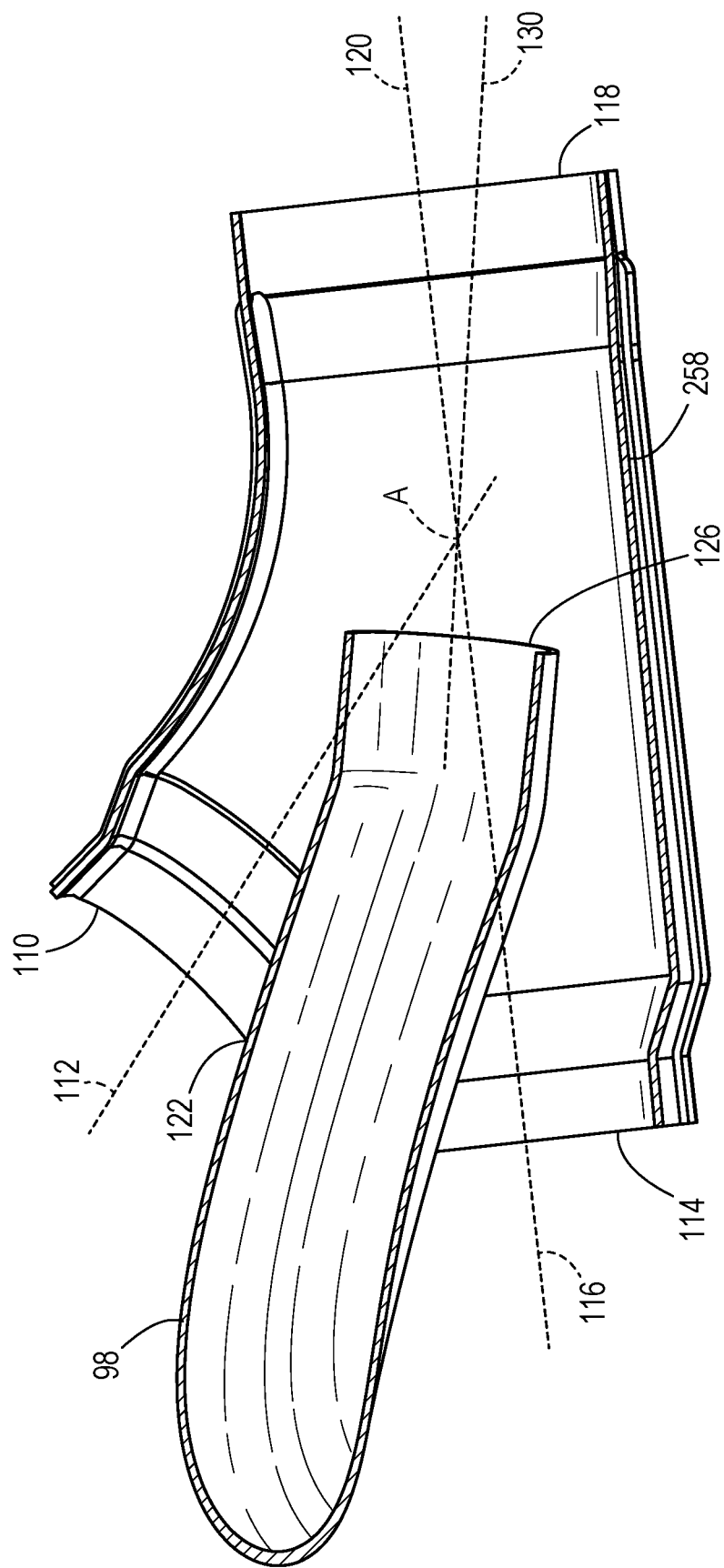
FIG. 5 is a cross section of the collector and the heater.

As shown in FIGS. 3-5, another construction of a collector 258 is illustrated with similar reference numbers as used for the collector 58. The collector 258 includes a first exhaust inlet 110, a second exhaust inlet 114, a third inlet or heater inlet 122, and an outlet 118. The first inlet 110 couples the first pipe 50 to the collector 58. The second inlet 114 couples the second pipe 54 to the collector 258. The third inlet 122 receives the connecting portion 98 of the heater assembly 62. The connecting portion 98 extends towards the center of the collector 258 and includes a bend in the pipe to define the end 126. The end 126 is pointed towards the outlet 118 and defines a connecting portion axis 130. The inlet axis 112, the inlet axis 116, and the connecting portion axis 130 intersect at a point A. The connecting portion axis 130 is arranged with an equal angular offset from the inlet axis 112 and the inlet axis 116. The inlet axis 112 and the inlet axis 116 are configured to be offset from the outlet axis 120. The outlet axis 120 is not aligned with the inlet axis 112, the inlet axis 116, and the connecting portion axis 130. In the illustrated embodiment, the inlet axis 112 is angularly offset from the outlet axis 120, and the inlet axis 116 is parallel to the outlet axis 120. The inlet axis 116 is located longitudinally towards the outer wall of the collector 58 compared to the outlet axis 120. In other embodiments, the offset between the inlet axis 112 and the inlet axis 116 to the outlet axis 120 may be greater or smaller than illustrated in FIG. 5 to accommodate for the organization of the first pipe 50 and the second pipe 54. In some constructions, the inlet axis 112 is offset from the outlet axis 120 and the inlet axis 116 is aligned with the outlet axis 120.

In other constructions, the internal combustion engine 10 of FIG. 1 is modified to include only the first bank 34 (i.e., the second bank 38 is absent). The first bank 34 may be connected to the inlets 110, 114 of the collector 58 (or alternatively the collector 258) via a plurality of pipes, either with or without manifolds, per se. For instance, the internal combustion engine 10 may be modified such that the first manifold 42 is divided into a plurality of separate manifolds to receive exhaust gases from the exhaust ports 48 of the first plurality of cylinders 26. Ahead of the collector 58, 258, the exhaust from the plurality of exhaust ports 48 can be combined into two pipes 50, 54 for passage into the collector 58, 258. The first plurality of cylinders 26 may include four cylinders as shown in FIG. 1 or an alternative number such as two, three, or more than four cylinders. In other constructions, the internal combustion engine 10 of FIG. 1 may have multiple manifolds on each of the multiple cylinder banks 34, 38. The additional pipes can either be consolidated to the two pipes 50, 54 for connection to the collector 58, 258, or the collector can be modified to include additional inlets, as discussed further below.

In other constructions, the internal combustion engine of 10 of FIG. 1 may be modified such that the exhaust port(s) 48 of the first cylinder bank 34 and the exhaust port(s) 48 of the second cylinder bank 38 are connected to the collector 58, 258 with individual pipes rather than manifolds. One such example is that in which the internal combustion engine 10 includes a single cylinder in the first bank 34 and a single cylinder in the second bank 38 (i.e., a "V-twin" engine). The single first cylinder is coupled to the first pipe 50 and the single second pipe is coupled to second pipe 54 for subsequent routing into the collector 58, 258.

As mentioned in the paragraphs above, the internal combustion engine 10 of FIG. 1 may include multiple pipes to accommodate for multiple manifolds or a lack thereof. In some constructions, the collector 58, 258 is modified to include more than two exhaust inlets. Such a collector may include three, four, or more inlets, up to the number of cylinders of the engine. Similar to the collectors 58, 258, such a collector may have an inlet receiving the connecting portion 98 of the heater assembly 62, the axis of which can intersect at a point with the exhaust inlet axes. Some or all of the plurality of exhaust inlets of the collector may be symmetrically disposed about the connecting portion 98 and/or the outlet 118 of the collector. In some constructions, the exhaust inlets, are asymmetrically disposed about the connecting portion 98 and/or the outlet 118.

What is claimed is:

1. An internal combustion engine comprising:
   a first manifold coupled to exhaust ports of a first plurality of cylinders to receive exhaust gas therefrom;
   a second manifold coupled to exhaust ports of a second plurality of cylinders to receive exhaust gas therefrom;
   a first pipe configured to receive the exhaust gas from the first manifold;
   a second pipe configured to receive the exhaust gas from the second manifold;
   a collector including a first inlet coupled to the first pipe, a second inlet coupled to the second pipe, and an outlet, the outlet configured to receive a merged flow of the exhaust gas from the first pipe and the second pipe;
   a catalyst configured to receive a merged flow of the exhaust gas from the outlet of the collector and configured to treat the exhaust gas from the first pipe and the second pipe; and
   a heater assembly configured to selectively supply heat energy to the exhaust gas from the first pipe and the second pipe, the heater assembly including a connecting portion coupled to the collector,
   wherein the first inlet and the second inlet are angled apart to define a space,
   wherein the collector includes a third inlet in the space, the third inlet configured to receive the connecting portion.

2. The internal combustion engine of claim 1, wherein the first plurality of cylinders and the second plurality of cylinders are disposed on separate banks on opposing sides of a crankshaft axis.

3. The internal combustion engine of claim 1, further comprising:
   a first axis defined by the outlet; and
   a second axis defined by an end of the connecting portion, wherein the second axis is aligned to the first axis.

4. The internal combustion engine of claim 1, further comprising:
   a first axis defined by the outlet;
   a second axis defined by an end of the connecting portion;
   a third axis defined by the first inlet; and
   a fourth axis defined by the second inlet, wherein the third axis and the fourth axis are configured to intersect at a point and the second axis is configured to extend through the intersection point.

5. The internal combustion engine of claim 4, wherein the third axis is offset to the first axis.

6. The internal combustion engine of claim 4, wherein the second axis is aligned to the first axis.

7. The internal combustion engine of claim 4, wherein the third axis is skewed relative to the first axis, and wherein the fourth axis is parallel to the first axis.

8. The internal combustion engine of claim 1, wherein no catalyst is located between the exhaust ports of the first plurality of cylinders and the second plurality of cylinders and the collector.

9. The internal combustion engine of claim 1, wherein the catalyst is a three-way catalyst.

10. The internal combustion engine of claim 1, wherein the heater assembly includes a fuel burning heater.

11. The internal combustion engine of claim 1, wherein the heater assembly includes a control unit programmed with an algorithm configured to output a signal to the heater assembly to control an output thereof.

12. The internal combustion engine of claim 11, wherein the control unit is programmed with the algorithm configured to output the signal to the heater assembly on the basis of a signal reporting the efficiency of the catalyst.

13. An internal combustion engine comprising:
a first bank and a second bank disposed on opposing sides of a crankshaft axis;
a first pipe coupled to an exhaust port of a first cylinder on the first bank to receive exhaust gas therefrom;
a second pipe coupled to exhaust port of a second cylinder on the second bank to receive exhaust gas therefrom;
a collector including a first inlet coupled to the first pipe, a second inlet coupled to the second pipe, and an outlet, the outlet configured to receive a merged flow of the exhaust gas from the first pipe and the second pipe;
a catalyst configured to receive a merged flow of the exhaust gas from the outlet of the collector and configured to treat the exhaust gas from the first pipe and second pipe; and
a heater assembly configured to selectively supply heat energy to the exhaust gas from the first pipe and the second pipe, the heater assembly including a fuel burning heater and a connecting portion, the connecting portion coupled to the collector and disposed between the first inlet and the second inlet,
wherein the first inlet and the second inlet are angled apart to define a space,
wherein the collector includes a third inlet in the space, the third inlet configured to receive the connecting portion.

14. The internal combustion engine of claim 13, further comprising:
a first axis defined by the outlet;
a second axis defined by an end of the connecting portion;
a third axis defined by the first inlet; and
a fourth axis defined by the second inlet, wherein the third axis and the fourth axis are configured to intersect at a point and the second axis is configured to extend through the intersection point.

15. The internal combustion engine of claim 14, wherein the second axis is offset equally from the third axis and the fourth axis, and the second axis is aligned to the first axis.

16. The internal combustion engine of claim 14, wherein the fourth axis is parallel to the first axis.

17. The internal combustion engine of claim 13, wherein the first inlet and the second inlet are disposed symmetrically about the outlet of the collector.

18. The internal combustion engine of claim 13, wherein the connecting portion includes a mixer to mix the air and fuel of the heater assembly.

19. The internal combustion engine of claim 13, wherein the catalyst is aligned with the outlet.

* * * * *